Sept. 5, 1939.  J. J. KORN  2,171,935

SAFETY BOX FOR LEAKING GAS LINES

Filed Sept. 24, 1936

Inventor
John J. Korn

Patented Sept. 5, 1939

2,171,935

UNITED STATES PATENT OFFICE 2,171,935

SAFETY BOX FOR LEAKING GAS LINES

John J. Korn, Butte, Mont.

Application September 24, 1936, Serial No. 102,297

2 Claims. (Cl. 48—193)

My invention relates to an improvement in safety boxes for leaking gas lines for the purpose of collecting gas passing along the outside of gas pipes entering a building, or along a main gas 5 line.

It has been found that when a leak occurs in a gas line buried in the ground, there is a strong tendency for the gas to follow along the outside of the pipes into the buildings, collecting there 10 until it causes an explosion. Because of the expansion and contraction of the pipes, there is often enough movement of the pipe to provide a space about the pipe through which such gas may easily pass. This space may be above the 15 pipe, below the pipe, or entirely around the pipe in some places.

Efforts have been made to trap this gas before it enters the building, and attempts to meet the problem have resulted in several forms of devices. 20 I have found, however, that in the past these devices have consisted in single baffle walls with a collecting hood mounted in the ground high above the pipe, or have been in the form of substantially cylindrical members surrounding the pipe and 25 spaced therefrom at the entrance end. While these devices are successful in collecting some of the gas, I have found that baffle walls having a collecting hood spaced above the pipe are not thoroughly efficient; and that cylindrical collec30 tors, fastened to the pipe, move with the pipe and soon provide a passage through the ground about the outside of the cylinder, permitting a portion of the gas to pass around the collector.

It is the purpose of my invention to provide a 35 safety box capable of overcoming these difficulties found in former constructions, and to collect virtually all of the gas passing along the gas pipes from a leak in the pipe. This I accomplish by providing a collector in the form of an inverted 40 channel or trough, having an open bottom and closed at the top and on each side. Such a device, if properly installed, will act to collect any leading gas effectively.

It is a feature of my invention to provide a 45 safety box comprising an end baffle wall to be secured about the gas pipe, to the edges of which are attached the end of an inverted channel or trough, the sides of which extend substantially below the level of the pipe. In this way I ascer50 tain that all of the gas will be collected without the danger of the earth closing off the vent opening formed at the top of the collector.

It is a further feature of my invention to provide a vent which extends up the side of the build55 ing and high above the occupants of the building or persons on the ground. This construction obviates danger of explosion by persons lighting matches near the vent, and avoids injury by gas fumes escaping through the vent.

An added feature of my invention is the provision of a valve and test cock, by means of which the vent may be tested from time to time to discover any leak in the pipe. A valve is positioned in the vent by means of which the vent may be closed; and a test cock may be opened below the valve in the vent pipe and tests may be made to determine whether or not gas is escaping through the vent.

These and other features and objects of my invention will be more clearly and fully set forth in the following specification and claims.

In the drawing forming a part of my specification:

Figure 1:
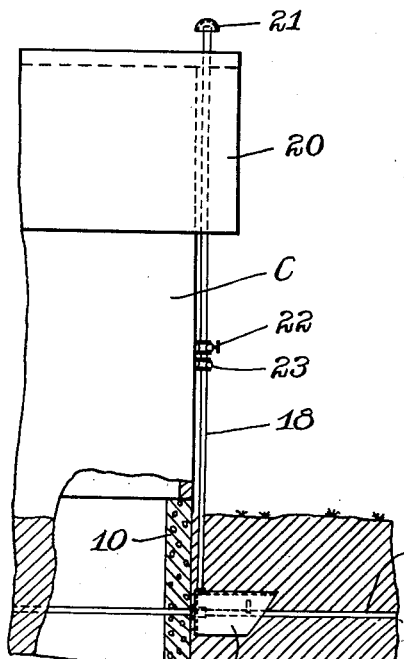
Figure 1 is a diagrammatic view, partly in section, of a house having my safety box installed on the gas pipe leading thereinto.
Figure 4:
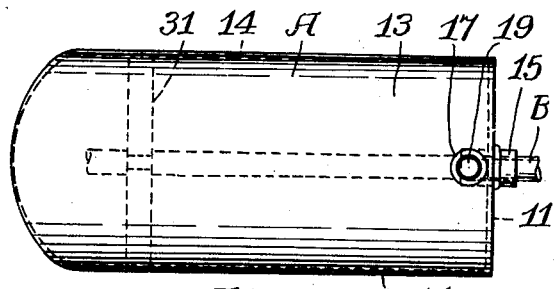
Figure 4 is a top plan view of my safety box, with a fragment of gas pipe extending thereinto.
Figure 5:
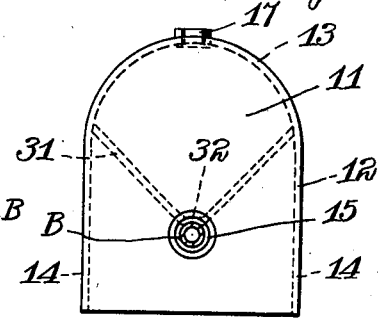
Figure 5 is an end view of the safety box illustrated in Figures 2 and 4.
Figure 6:
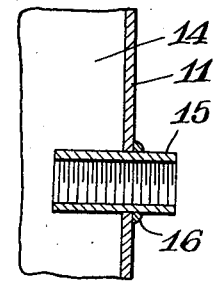
Figure 6 is a fragmentary view sectionally through a portion of the end of my safety box taken on a plane vertically through the center of the box, longitudinally.

My safety box A is designed to be mounted upon the gas pipe B adjacent the building C as diagrammatically illustrated in Figure 1 of the drawing. The pipe B is buried in the ground, and extends through the wall 10 of the building C, or extends beneath this wall, entering the building through an opening in the floor.

My safety box A comprises an end wall 11, to which is attached integrally an inverted trough or channel 12, having in preferred form an arcuated top portion 13, and integral depending side walls 14. The open end of the trough 12, opposite the end wall 11, may be tapered as illustrated, so that the depending side walls at the bottom are not as long as the arcuated top portion 13.

Extending through the end wall 11, I provide a nipple 15 into which the gas pipe B may be threadedly connected. This nipple is attached integrally to the wall 11, by welding 16 as illustrated, or by any other suitable means.

At the top of the trough or channel 12 I provide a coupling 17, the axis of which extends vertically and into which the vent pipe 18 may be threaded. The coupling 17 may be welded to the trough 12 in a manner to provide an opening 19 through the coupling extending into the interior of the trough or channel 12.

The vent pipe 18 extends vertically from the coupling 17, along the outer surface of the building C, projecting above the roof 20 of the building. The top of the vent pipe 18 is provided with a cap 21 to eliminate snow, rain or sleet from passing into, or closing up, the vent pipe.

In the vent pipe 18, above the surface of the ground, I provide a shut off valve 22 for the purpose of closing off the flow of gas through the vent pipe above this joint. Just below the valve 22 I provide a test cock 23 which may be opened when the valve 22 has been closed. The gas, in case of a leak in the pipe, will then pass through the test cock and tests may be made to determine this fact. In this way, by making periodic tests, the leaks in a gas line may be detected and repaired before extensive damage has been done.

Figure 7:
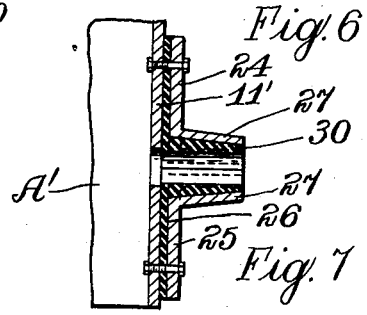
Figure 7 is a sectional view similar to Figure 6, showing the construction of the modified form of construction illustrated in Figure 3 of the drawing.
Figure 3:
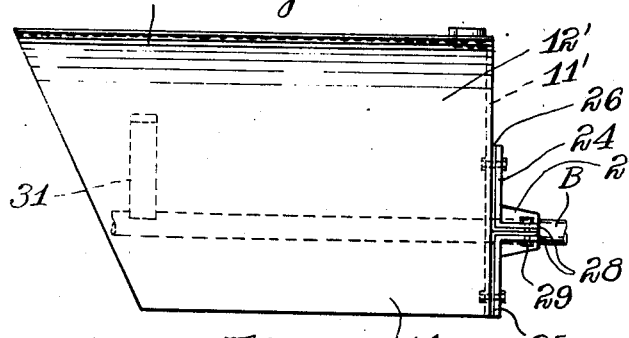
Figure 3 is a view similar to Figure 2, illustrating a modified form of packing joint.

In the construction illustrated in Figures 3 and 7, the gas pipe B extends through a packing joint in entering the collector. The collector A' is formed similarly to the formation of the collector A, having an end wall 11' and a trough-shaped or channel-shaped hood 12' secured integrally thereto. A pair of clamping plates 24 and 25 are bolted to the end wall 11', a rubber packing member or gasket being interposed between the plates 24 and 25 and the end wall. The gasket of packing is indicated at 26. The clamping plates are provided with a tapering clamping portion 27 on the same, provided with flanges 28 through which bolts 29 may be extended to clamp the portions 27 together. Within the clamping portions 27, I provide a tapered rubber washer 30 which forms a packing between the plates 24 and 25 and the pipe B.

Figure 8:
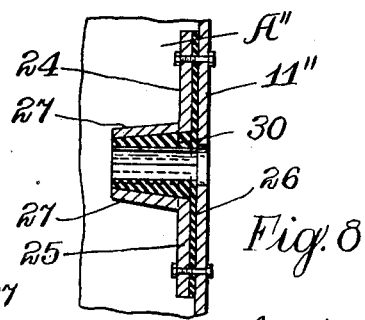
Figure 8 is a sectional view similar to Figure 7, but having the packing means secured on the inside, rather than the outside, of the box.

The collector A" illustrated in Figure 8 is similar to that of Figures 3 and 7, except that the packing member extends inwardly from the end wall 11", rather than outwardly from the end wall, as in Figure 7. The collector A" is provided with clamping plates 24 and 25, and a gasket or packing 26. The tapering clamping portion 27, the flanges 28, the bolts 29, and the tapered rubber washer 30 are similar to those of Figure 7, and are merely attached on the opposite side of the end wall of the collector.

To provide a means of supporting the open end of the box A or A', I provide a brace 31 which is secured by welding or other suitable means to oppositely disposed sides 14 of the box. The central portion of the brace 31 is arcuated at 32 to rest upon the surface of the pipe B extending into the box. The end of the box opposite the end wall is in this way prevented from being urged downwardly by the force of the dirt piled thereupon.

It will be readily understood that various changes coming within the spirit of my invention may suggest themselves to those skilled in the art. For example, while the safety box has been described as being particularly adapted for service lines leading into buildings, it will be clearly apparent that these boxes could as well be placed on the main gas line. In this case, the vent pipes could readily extend up along telephone poles, and be provided with a valve and a test cock in the manner previously described. This arrangement would be of great value in determining the position of leaks in the main line; and for relatively small expense in installation the cost of the upkeep of the main lines could be very materially reduced.

Figure 2:
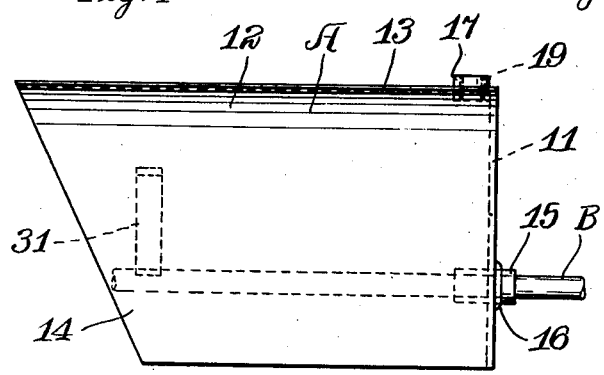
Figure 2 is a side elevation view of my safety box with a fragment of gas pipe extending thereinto.

Of the two modifications illustrated, that of Figure 2 is particularly adapted for use in new installations, and would be simplest and most effective for installation at the time of service line installation. The modification of Figure 3 is more readily adapted for use on the lines which are already in use, and would be easier to install on such lines. The construction of Figure 8 could be placed more closely adjacent a building than that of Figure 7.

In accordance with the patent statutes, I have described the principles of operation and construction of my safety box for leaking gas lines; and while I have endeavored to set forth the best embodiments thereof, I desire to have it understood that I do not wish to be limited to the specific form shown or use mentioned, except to the extent of the scope of the appended claims, which are to be interpreted as broadly as the state of the art will permit.

I claim:

1. A safety box for gas lines including a housing mounted on the gas line for collecting the gas, a vent in the top of said housing, a vent pipe extending upwardly from said housing, a valve in said vent pipe, a test cock interposed in said vent pipe between said valve and said housing through which gas passing through said vent pipe is directed when said valve is closed.

2. A safety box for use with a gas pipe extending into a building including an inverted trough with side walls extending substantially below the level of the gas pipe and covering said pipe, a vent pipe in communication with the interior of said inverted trough, said vent pipe extending above the top of said building, a shut-off valve in said vent pipe, and a test cock in said vent pipe between said shut-off valve and said inverted trough.

JOHN J. KORN.